(12) United States Patent
Capareda et al.

(10) Patent No.: US 11,186,779 B2
(45) Date of Patent: Nov. 30, 2021

(54) DEVICES AND METHODS FOR A PYROLYSIS AND GASIFICATION SYSTEM FOR BIOMASS FEEDSTOCK

(71) Applicant: The Texas A&M University System, College Station, TX (US)

(72) Inventors: Sergio C. Capareda, College Station, TX (US); Calvin B. Parnell, Jr., College Station, TX (US); David B. Carney, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 16/502,941

(22) Filed: Jul. 3, 2019

(65) Prior Publication Data
US 2019/0322942 A1    Oct. 24, 2019

Related U.S. Application Data

(63) Continuation of application No. 13/577,248, filed as application No. PCT/US2011/023933 on Feb. 7, 2011, now abandoned.
(Continued)

(51) Int. Cl.
*C10B 53/02* (2006.01)
*C10B 49/22* (2006.01)
(Continued)

(52) U.S. Cl.
CPC ............... *C10B 53/00* (2013.01); *B01J 8/44* (2013.01); *B04C 5/26* (2013.01); *C10B 49/22* (2013.01); *C10B 53/02* (2013.01); *C10J 3/463* (2013.01); *C10J 3/482* (2013.01); *C10J 3/503* (2013.01); *C10J 3/54* (2013.01); *C10J 3/84* (2013.01); *C10K 1/026* (2013.01); *F16L 41/02* (2013.01);
(Continued)

(58) Field of Classification Search
CPC .... C10J 3/463; C10J 3/482; C10J 2300/0916; C10J 2300/0926; C10J 2300/0956; C10J 3/46–3/56; C10J 3/723; C10B 47/24; C10B 49/10; C10B 49/16; C10B 49/18; C10B 49/20; C10B 49/22; B01D 5/0027; B01D 5/003; B01J 8/44
See application file for complete search history.

(56) References Cited

U.S. PATENT DOCUMENTS

| 4,848,249 A | * | 7/1989 | LePori | ...................... F23C 6/04 |
| | | | | 110/234 |
| 4,931,171 A | * | 6/1990 | Piotter | ...................... C10G 1/02 |
| | | | | 208/407 |

(Continued)

*Primary Examiner* — Jonathan Luke Pilcher
(74) *Attorney, Agent, or Firm* — Tumey L.L.P.

(57) ABSTRACT

A pyrolysis and gasification system produce a synthesis gas and bio-char from a biomass feedstock. The system includes a feed hopper that has a flow measurement device. The system also includes a reactor that is operable in a gasification mode or a pyrolysis mode. The reactor is configured to receive the biomass feedstock from the feed hopper. The reactor is operable to provide heat to the biomass feedstock from the feed hopper to produce the synthesis gas and bio-char. The system also includes a cyclone assembly. The produced synthesis gas including the bio-char is fed to the cyclone assembly. The cyclone assembly removes a portion of the bio-char from the synthesis gas.

9 Claims, 3 Drawing Sheets

Related U.S. Application Data

(60) Provisional application No. 61/302,001, filed on Feb. 5, 2010.

(51) Int. Cl.

| | |
|---|---|
| *C10J 3/46* | (2006.01) |
| *C10B 53/00* | (2006.01) |
| *C10J 3/48* | (2006.01) |
| *C10K 1/02* | (2006.01) |
| *B04C 5/26* | (2006.01) |
| *F23C 10/20* | (2006.01) |
| *F23C 10/10* | (2006.01) |
| *C10J 3/84* | (2006.01) |
| *C10J 3/50* | (2006.01) |
| *F23G 5/027* | (2006.01) |
| *B01J 8/44* | (2006.01) |
| *F23G 5/30* | (2006.01) |
| *F23G 7/10* | (2006.01) |
| *C10J 3/54* | (2006.01) |
| *F16L 41/02* | (2006.01) |
| *G01F 1/76* | (2006.01) |

(52) U.S. Cl.
CPC .............. *F23C 10/10* (2013.01); *F23C 10/20* (2013.01); *F23G 5/027* (2013.01); *F23G 5/30* (2013.01); *F23G 7/10* (2013.01); *G01F 1/76* (2013.01); *C10J 2200/15* (2013.01); *C10J 2300/0916* (2013.01); *C10J 2300/0956* (2013.01); *F23G 2201/40* (2013.01); *F23G 2203/501* (2013.01); *F23J 2217/40* (2013.01); *Y02P 20/145* (2015.11); *Y10T 137/85938* (2015.04)

(56) References Cited

U.S. PATENT DOCUMENTS

| | | | | |
|---|---|---|---|---|
| 5,853,548 | A | * | 12/1998 | Piskorz ............... B01J 8/1836 201/7 |
| 7,309,378 | B2 | * | 12/2007 | Bancon ................. C01B 3/56 95/96 |
| 8,083,818 | B2 | * | 12/2011 | Ploeg .................... C10J 3/72 48/197 R |
| 2002/0134019 | A1 | * | 9/2002 | Paisley ............... F16L 43/00 48/197 R |
| 2007/0151155 | A1 | * | 7/2007 | Ploeg .................. C10J 3/723 48/210 |

* cited by examiner

US 11,186,779 B2

DEVICES AND METHODS FOR A PYROLYSIS AND GASIFICATION SYSTEM FOR BIOMASS FEEDSTOCK

This application is a continuation of U.S. application Ser. No. 13/577,248, filed Oct. 23, 2012, which was filed under 35 U.S.C. 371 based upon international application Ser. No. PCT/US2011/023933 filed Feb. 7, 2011 which claims priority to U.S. provisional application Ser. No. 61/302,001 filed Feb. 5, 2010, all of which are incorporated by reference herein in their entirety.

BACKGROUND OF THE INVENTION

Field of the Invention

This invention relates to the field of biomass conversion and more specifically to the field of pyrolysis and gasification of biomass feedstock.

Background of the Invention

Methods for using energy from biomass have conventionally. included combustion of the biomass with the heat energy used to produce steam. The steam may then be used to produce electric power. Drawbacks to such conventional methods include slagging and fouling that occur with biomass fuels containing low eutectic point (i.e., melting point) ash. For instance, the ash melts at relatively low temperatures and sticks to surfaces, which may impact the sustainability of the thermal conversion system. Developments have included using bag filters to remove char by filtration. For such developments, the gas temperature is cooled to a temperature at which the temperature of the gas is below the temperature that may result in damage to the bag filter media. Drawbacks to such developments include inefficiencies with the performance of the bag filter for removing the smaller particulates.

Consequently, there is a need for an improved system for conversion of biomass. Additional needs include a mobile pyrolysis and gasification system for biomass feedstock.

BRIEF SUMMARY OF SOME OF THE PREFERRED EMBODIMENTS

These and other needs in the art are addressed in one embodiment by a pyrolysis and gasification system for producing a synthesis gas and bio-char from a biomass feedstock. The system includes a feed hopper that has a flow measurement device. The system also includes a reactor that is operable in a gasification mode or a pyrolysis mode. The reactor is configured to receive the biomass feedstock from the feed hopper. The reactor is operable to provide heat to the biomass feedstock from the feed hopper to produce the synthesis gas and bio-char. The system also includes a cyclone assembly. The produced synthesis gas having bio-char is fed to the cyclone assembly. The cyclone assembly removes bio-char from the synthesis gas.

These and other needs in the art are addressed in another embodiment by a method for gasification and pyrolysis of a biomass feedstock in a reactor. The reactor includes bed materials. The method includes introducing a fluidizing medium to the bed materials to fluidize the bed materials and to produce a fluidized condition. The method also includes heating the bed materials to a desired temperature. The heating is provided by a heat source. The method also includes feeding the biomass feedstock to the bed materials. A reaction produces a synthesis gas and bio-char from the biomass feedstock. In addition, the method includes controlling the temperature of the bed materials to maintain the fluidized condition in a pyrolysis mode. The method further includes removing the bio-char from the reactor.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
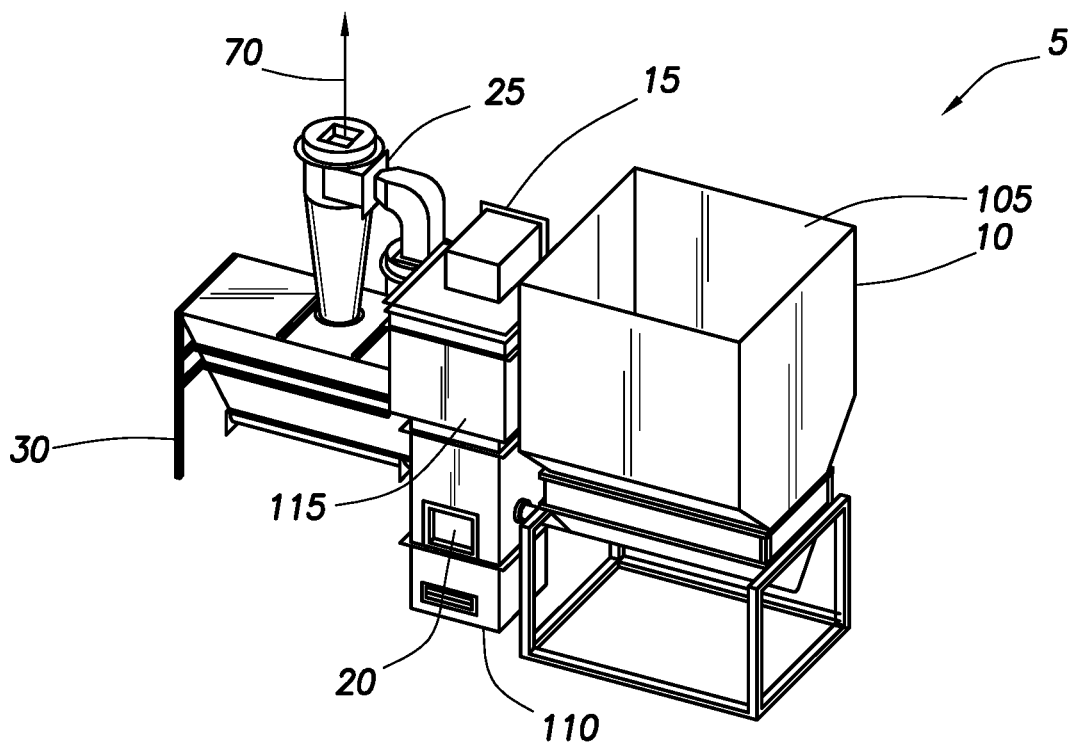
FIG. 1 illustrates a side perspective view of an embodiment of a pyrolysis and gasification system.
Figure 2:
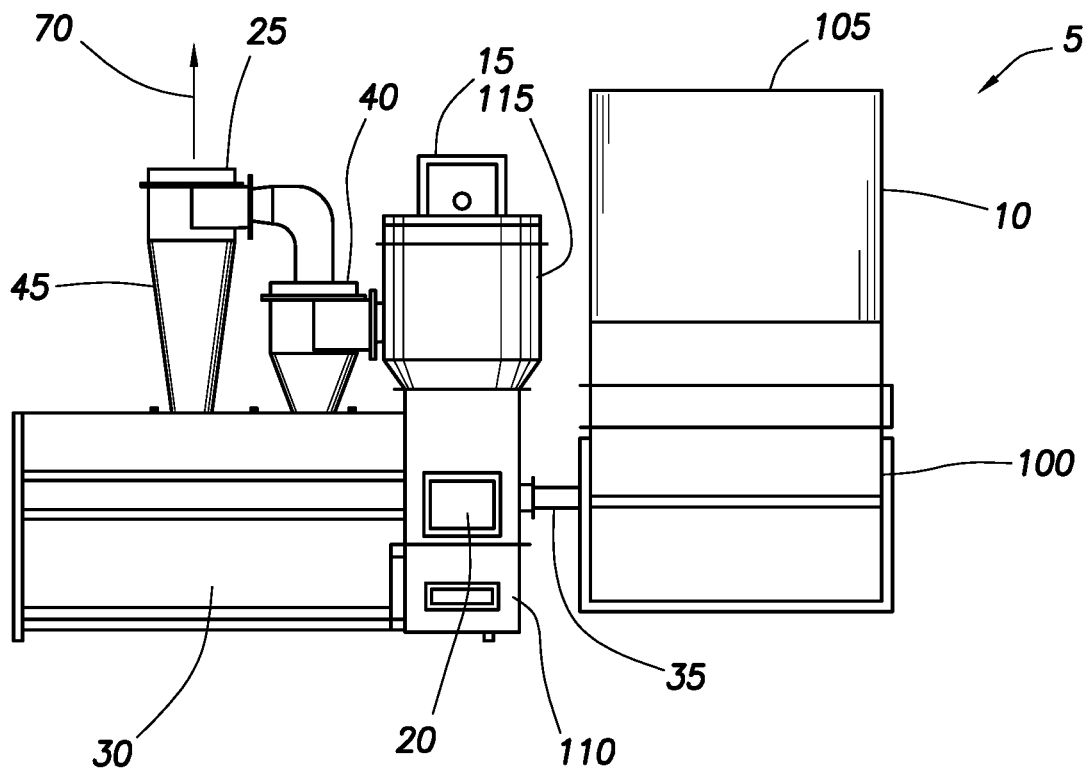
FIG. 2 illustrates a side view of the embodiment of the pyrolysis and gasification system illustrated in FIG. 1.

FIG. 1 illustrates a side perspective view of an embodiment of pyrolysis and gasification system 5 that includes feed hopper 10, reactor 15, reactor bed 20, cyclone assembly 25, and char collector 30. FIG. 2 illustrates a side view of the embodiment of pyrolysis and gasification system 5 illustrated in FIG. 1. It is to be understood that reactor bed 20 is disposed within reactor 15. In an embodiment, pyrolysis and gasification system 5 produces synthesis gas (i.e., syngas), bio-char (i.e., char) and bio-oil from a biomass feedstock. Pyrolysis and gasification system 5 also produces syngas 70. The biomass feedstock may include any biomass. For instance, without limitation, examples of the biomass feedstock include cotton gin trash (for instance, pulverized cotton gin trash or raw cotton gin trash), switch grass, sorghum, sludge, straw, rye, wood chips, poultry litter, dairy manure, and the like. The reactor 15 is operable in a gasification mode or a pyrolysis mode. It is to be understood that gasification mode refers to the use of an oxidant for conversion that is below stoichiometric limits. It is to be further understood that pyrolysis mode refers to incomplete absence of oxygen during conversion.

As shown in FIGS. 1 and 2, feed hopper 10 has a sufficient height and depth to achieve a desired continuous feed of biomass feedstock to reactor 15. In an embodiment, the biomass feedstock is fed to the top portion 105 of feed hopper 10. In some embodiments, feed hopper 10 includes a flow measurement device 100. Flow measurement device 100 may be any device suitable for measuring the feed of biomass feedstock to reactor 15. Feed hopper 10 also includes reactor feed 35. Reactor feed 35 is a connection between feed hopper 10 and reactor 15 by which the biomass feedstock is fed to reactor 15 from feed hopper 10.

As further shown in FIGS. 1 and 2, embodiments of reactor 15 include reactor bed 20 disposed within reactor 15. Reactor 15 may include any suitable type of burner. In an embodiment, the burner is a natural gas or propane burner. Any type of combustible gas suitable for reactor 15 may be used. In an embodiment, the gas may include nitrogen, helium, argon, or any combinations thereof. In embodiments, the gas is nitrogen. Embodiments of pyrolysis and gasification system 5 also include a fluidizing medium input (not illustrated) and an air distribution system (not illustrated). The fluidizing medium input provides a fluidizing medium to the air distribution system. Any fluidizing medium suitable to fluidize reactor bed 20 may be used. In an embodiment, the fluidizing medium is air, an inert gas, or any combinations thereof. In an embodiment, the fluidizing medium is air. The air distribution system provides the fluidizing medium to the reactor bed 20. In embodiment, the provided fluidizing medium fluidizes the reactor bed 20. In embodiments, the air distribution system is submerged in the bed materials of reactor bed 20. Without limitation, the air distribution system may include any method suitable to fluidize reactor bed 20. For instance, in embodiments, the air distribution system includes a plate with orifices or bubble caps. In embodiments, the angle of repose of the bed materials is noted, and the height of the bubble caps is designed to be greater than the angle of repose of the bed materials. Any bed materials suitable for a fluidized bed in a reactor may be used for reactor bed 20. In embodiments, the bed materials are minerals with a sand-like consistency. In an embodiment, examples of suitable bed materials include alumina, refractory, and metal-based refractory. Without limitation, a commercial example of the bed materials is Mulcoa Mulgrain provided by C-E Minerals. In an embodiment, the particle size of the bed materials is selected for a desired air flow. In some embodiments, the bed materials are not provided in different sizes but may only be available with all sizes combined. In such embodiments, the bed materials of the desired size are separated by sieve shaking. In some embodiments, the size of the bed materials is selected to achieve a desired air flow rate. Without limitation, in an embodiment, changing the size of the bed material during operation allows pyrolysis and gasification system 5 to operate at higher throughput without increasing the diameter of the fluidized reactor bed 20.

Reactor 15 may have any suitable configuration for pyrolysis and gasification of the biomass feedstock. In embodiments as shown in FIGS. 1 and 2, reactor 15 has a narrower bottom portion 110 with an upper portion 115 that increases in diameter over that of bottom portion 110. Without limitation, such increase in diameter reduces the velocity of the air flow in the upper portion 110. Further, without limitation, such reduction in velocity facilitates the heavier bed materials remaining in reactor 15 and the lighter produced char exiting reactor 15. It is to be understood that reactor 15 is not limited to such a configuration but in alternative embodiments (not illustrated) may have any suitable configuration for pyrolysis and gasification of the biomass feedstock.

As further shown in FIGS. 1 and 2, embodiments of pyrolysis and gasification system 5 include cyclone assembly 25. Cyclone assembly 25 removes char from the produced syngas exiting reactor 15. Cyclone assembly 25 may have any suitable number of cyclones. In embodiments as shown, cyclone assembly 25 has two cyclones, first cyclone 40 and second cyclone 45. Without limitation, two cyclones 40, 45 maximize removal of the solid by-product (i.e., char) from the syngas. In an embodiment, first cyclone 40 is a low energy cyclone, and second cyclone 45 is a high efficiency cyclone. It is to be understood that a low energy cyclone removes larger particles that would impact the performance of the high efficiency cyclones on the second stage. It is also to be understood that a high efficiency cyclone removes the finer char particles to limit particulate emissions. Without limitation, the char must be removed first prior to the use of syngas in order to prevent slagging and fouling in downstream conveying surfaces. The char separated from the syngas is fed to char collector 30. The syngas 70 separated from the char exits cyclone assembly 25.

Figure 3:
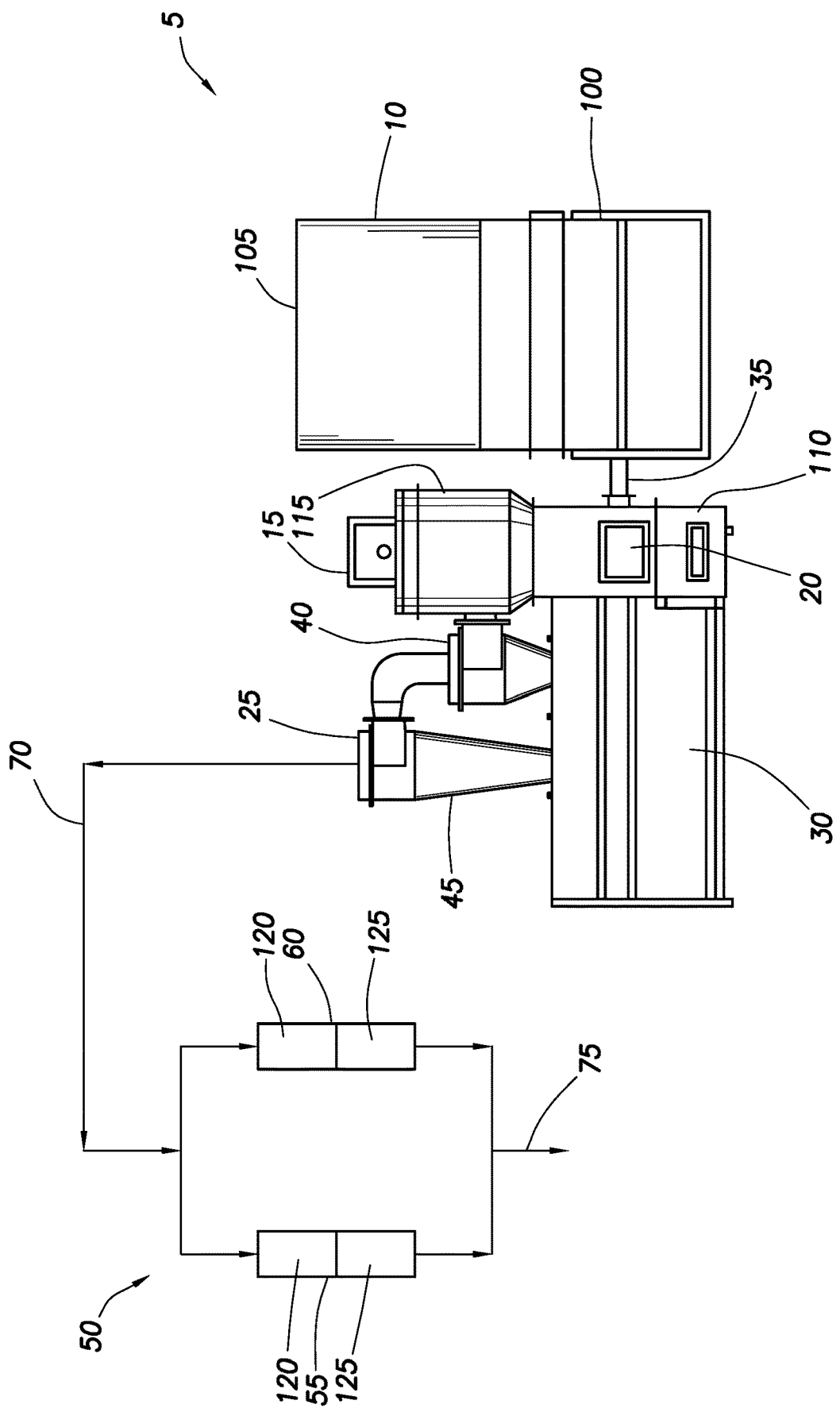
FIG. 3 illustrates a side view of an embodiment of a pyrolysis and gasification system having a pressure swing absorption system.

FIG. 3 illustrates an embodiment of pyrolysis and gasification system 5 in which syngas 70 is fed to pressure swing absorption system 50. Pressure swing absorption system 50 removes desired contaminants from the syngas 70 and provides reduced contaminant syngas 75. The desired contaminants include carbon monoxide, methane, and hydrogen. In an embodiment as shown, pressure swing absorption system 50 has two absorbers, first absorber 55 and second absorber 60. First absorber 55 and second absorber 60 each have an activated carbon section 120 and a molecular sieve section 125. In embodiments, the syngas 70 passes through activated carbon section 120 and then passes through molecular sieve section 125 before exiting first absorber 55 or second absorber 60 as reduced contaminant syngas 75. In alternative embodiments (not illustrated), the syngas 70 passes through molecular sieve section 125 and then passes through activated carbon section 120 before exiting first absorber 55 or second absorber 60 as reduced contaminant syngas 75. The activated carbon may include any suitable source of activated carbon for removing desired contaminants from syngas 70. Without limitation, an example of a suitable activated carbon source is coconut shell. The molecular sieve may include any suitable molecular sieve for removing desired contaminants from syngas 70 but allowing syngas 70 to pass therethrough. In embodiments, the molecular sieve has a pore size between about 9 Angstroms and about 10 Angstroms. In an embodiment, the molecular sieve is a 13(A) molecular sieve. Without limitation, the molecular sieve has a sufficient pore size selected to absorb hydrogen. Any materials suitable for absorbing contaminants may be used for the molecular sieve. In an embodiment, the molecule sieve is impregnated with cuprous oxides. In embodiments, the molecular sieve materials are calcined. Without limitation, calcined molecular sieve materials provide for the contaminants to be adsorbed on the outside of the molecular sieve materials. In some embodiments, the hydrogen and methane purged from the absorbers are separated. It is to be understood that such hydrogen and methane have value as products.

In an embodiment of operation of the embodiments illustrated in FIGS. 1-3, operation of pyrolysis and gasification system 5 includes preparing the bed material of reactor bed 20. In some embodiments, preparing the bed materials includes separating the desired size of bed materials from the bed materials of different sizes. The desired bed materials are then placed in reactor 15 to provide reactor bed 20. The fluidized medium input then provides pressure to the bed materials to fluidize the bed. In an embodiment, the fluidized medium is air, which when added to reactor bed 20 by the air distribution system provides the pressure. In embodiments, a minimum air flow is desired to fluidize the reactor bed 20. Without limitation, the minimum air flow prevents the reactor bed 20 from becoming a solid mass after the biomass feedstock packs between the bed material particles. In an embodiment, the minimum air flow is dependent upon the size of bed materials used.

With reactor bed 20 fluidized by the air from the air distribution system, embodiments of operation as shown in FIGS. 1-3 include activating the burner in reactor 15 to provide heat to the fluidized reactor bed 20 (i.e., by the burner burning nitrogen). In an embodiment, the reactor bed 20 is heated to about 600° C. to about 800° C., alternatively to about 800° C. to about 900° C. In embodiments, the diameter of the fluidized reactor bed 20 may be increased for higher thermal inputs. After the fluidized reactor bed 20 is heated to a desired temperature, the burner is turned off (i.e., combustion gas feed is stopped), and the biomass feedstock is fed to feed hopper 10 and from feed hopper 10 to reactor 15 via reactor feed 35. The heated and fluidized reactor bed 20 transfers heat to the biomass feedstock, converting a portion of the biomass feedstock to syngas. The produced syngas flows up reactor 15 and out to cyclone assembly 25. In cyclone assembly 25, char is removed from the syngas, with the char exiting cyclone assembly 25 to char collector 30. The syngas 70 exits cyclone assembly 25.

In embodiments as further shown in FIGS. 1-3, to increase the flow of biomass feedstock through reactor 15, the biomass feedstock feed rate and fluidizing medium flow rate may be increased. In an embodiment, the biomass feedstock feed rate is adjusted. In some embodiments, the biomass feedstock is below the eutectic point. Flow measurement device 100 determines the feed rate of the biomass feedstock to reactor 15. In embodiments, the fluidizing medium (i.e., air) flow rate and the biomass feedstock feed rate are adjusted to maintain a desired air to feedstock ratio. In some embodiments, the feedstock flow rate (i.e., volume) is adjusted to keep the reaction temperature constant, which prevents the reaction from proceeding into combustion mode and maintains the gasification mode of the reactor bed 20. It is to be understood that combustion mode refers to use of excess air for conversion that is above the stoichiometric limits. In an embodiment, if an increase in temperature of reactor 15 is desired, the air feed through the air distribution system is increased while maintaining the biomass feedstock feed rate. If a decrease in temperature is desired, the biomass feedstock feed rate is increased while maintaining the air feed (i.e., maintaining fluidization conditions of reactor bed 20). In embodiments, the feed ratio is maintained between about 0.2-0.4 equivalents (i.e., air to feedstock ratio). In an embodiment, a control system is provided for pyrolysis and gasification system 5 that automates the process. The automated process may adjust parameters such as the air flow rate and biomass feedstock feed rate based on set air to feedstock ratios.

In an embodiment of operation of the embodiments illustrated in FIG. 3, the produced syngas 70 may be fed to pressure swing absorption system 50 for removal of contaminants to provide reduced contaminant syngas 75. In some embodiments, reduced contaminant syngas 75 has about 0.1 wt. % or less hydrogen than syngas 70. In embodiments, syngas 70 is fed through first absorber 55 or second absorber 60 for absorption of contaminants with the non-operating first absorber 55 or second absorber 60 being purged of contaminants. When syngas 70 is fed to first absorber 55 or second absorber 60 for absorption of contaminants, the operating absorber (i.e., first absorber 55 or second absorber 60) is operated at any conditions suitable for absorption of contaminants. In an embodiment, the operating conditions include a pressure between about 310 kPa and about 710 kPa. In embodiments, the operating conditions include temperatures between about 150° C. and about 200° C. When the operating absorber is receiving the syngas 70 for absorption of contaminants, the other absorber may be purged of contaminants. Purging may be carried out at any conditions suitable for purging of contaminants. In an embodiment, purging conditions include a pressure between about atmosphere and about 310 kPa, alternatively between about 310 kPa and about 710 kPa. In embodiments, the purging conditions include temperatures between about 400° C. and about 600° C. For instance, in an embodiment, syngas 70 is fed to first absorber 55 and not second absorber 60. First absorber 55 is operated at suitable contaminant absorption conditions. First absorber 55 may operate to absorb contaminants for any desirable time period. In an embodiment, first absorber 55 absorbs contaminants from syngas 70 for between about 5 minutes and about 10 minutes. Without limitation, larger sized absorbers may be used for longer periods of absorption. After such a desired time period (i.e., between about 5 minutes and about 10 minutes), the feed of syngas 70 to first absorber 55 is stopped, and the syngas 70 is then fed to second absorber 60. Second absorber 60 is operated at absorption conditions for absorption of contaminants to produce reduced contaminant syngas 75. With no syngas 70 fed to first absorber 55, first absorber 55 is operated at purging conditions to purge the contaminants. After second absorber 60 has absorbed contaminants from syngas 70 for a desired time period (i.e., between about 5 minutes and about 10 minutes), syngas 70 is fed again to first absorber 55 for absorption with second absorber 60 being purged of contaminants. The purging and absorption may be switched between the absorbers 55, 60 for any desirable number of times. The purging may be accomplished with any suitable gas. In an embodiment, the purging gas is air. It is to be understood that pressure swing absorption system 50 is not limited to two absorbers, but in alternative embodiments (not illustrated), pressure swing absorption system 50 has more than two absorbers.

In embodiments (not illustrated), syngas 70 is fed to a condenser (not illustrated) to produce bio-oil from the syngas 70. The condenser may be operated at any suitable conditions to condense the syngas and produce the bio-oil. In an embodiment, reduced contaminant syngas 75 is fed to a condenser to produce bio-oil. In other embodiments (not illustrated), pyrolysis and gasification system 5 include reforming of the syngas 70 and/or reduced contaminant syngas 75 into synthetic liquid fuel via suitable catalytic processes.

Figure 4:
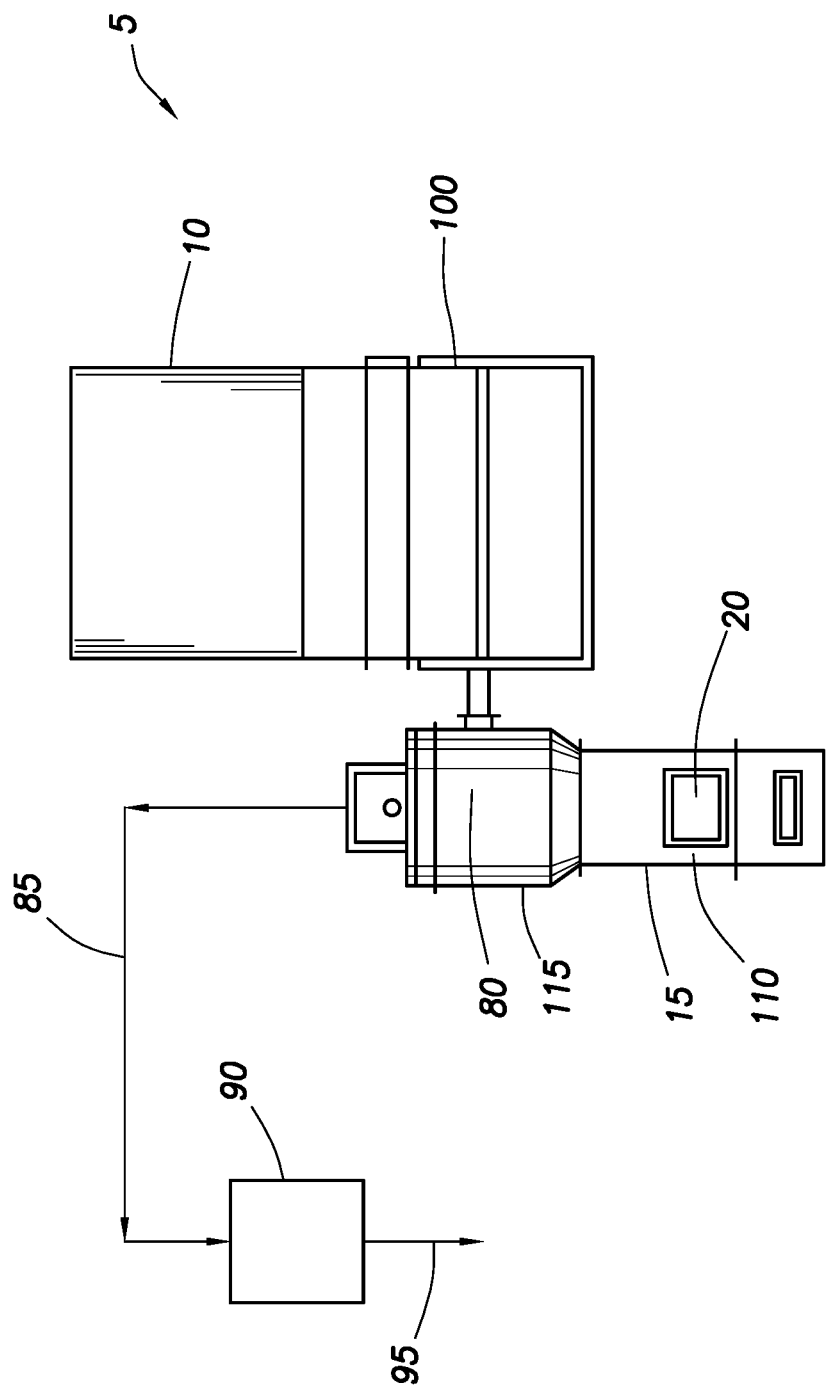
FIG. 4 illustrates a side view of an embodiment of a pyrolysis and gasification system having an auger and the reactor bed.

FIG. 4 illustrates an alternative embodiment of pyrolysis and gasification system 5 in which reactor 15 includes auger 80. Auger 80 is disposed in upper portion 115 of reactor 15. Auger 80 includes any type of auger suitable for providing the biomass feedstock from feed hopper 10 to upper portion 115. In embodiments, auger 80 includes a pipe disposed in upper portion 115 to which the auger 80 provides the biomass feedstock. Reactor bed 20 is fluidized and heated as in the embodiments of FIGS. 1-3. Heat produced from the heated reactor bed 20 rises up through reactor 15 and pyrolyzes a portion of the biomass feedstock to produce syngas. The syngas exits reactor 15. In embodiments, the syngas (with char) as syngas feed 85 exits reactor 15 and is fed to condenser 90 to produce bio-oil 95.

Without limitation, operation of pyrolysis and gasification system 5 provides for sustainable thermal conversion of energy using a wide range of biomass feedstock containing ash with a low melting point (i.e., low eutectic point) into a low calorific value gas (i.e., syngas 70). In some embodiments, syngas 70 and reduced contaminant syngas 75 may be combusted and used as heat in a boiler/steam turbine or directly in an engine/generator for electric power. In addition, the char may be removed from char collector 30. In embodiments, the produced char may have value as activated carbon or as soil enhancement. It is to be understood that pyrolysis and gasification system 5 may be sized up or down and may have any desired throughput of biomass feedstock. For instance, the pyrolysis and gasification system 5 may be sized up or down with different throughputs to produce any desired amount of power output. In some embodiments, pyrolysis and gasification system 5 may be scaled to allow for production of less than 1 MW of power output, alternatively from about 1 MW to about 3 MW of power output, and alternatively from about 1 MW to about 6 MW of power output. In embodiments, such output is produced with a single diameter fluidized bed (i.e., reactor bed 20), which in some embodiments is designed for one million Btu per square foot per hour or higher input.

In an embodiment, applications of pyrolysis and gasification system 5 provide a source of electric power for operating a cotton gin with the recovery of waste heat lost by pyrolysis and gasification system 5 used for drying the seed cotton in the ginning process. In an embodiment, there is sufficient energy in 250 pounds of gin trash per bale to operate the power plant and operate the gin at 50 kilowatt-hours per bale and 200,000 Btu per bale for drying with a thermal efficiency of 10%. For instance, a gin processing stripped cotton with a cleaner may average about 400 pounds of gin trash per bale. Stripped cotton without a cleaner typically contains 700 to 1,000 pounds of gin trash per bale. The biomass left in the field after harvesting may exceed 2 tons per acre. In an embodiment, an electric power generation system may include pyrolysis and gasification system 5 that may be operated to produce 1, 2, and 3 MW output using the low calorific value (LCV) gas (i.e., syngas 70 or reduced contaminant syngas 75) used to power an engine/generator. In embodiments, 1, 2, and 3 MW power outputs may provide sufficient electric power to operate 20, 40, and 60 bale per hour cotton gins, respectively. In embodiments, the pyrolysis and gasification system 5 may be engineered to operate at 1, 2, and 3 MW by adjusting the size of the bed materials for reactor bed 20, the biomass feedstock feed rate, and/or the air flow rate for fluidizing the reactor bed 20 to maintain a constant fuel-to-air ratio. The syngas 70 and/or reduced contaminant syngas 75 produced may operate the corresponding engine/generator sizes for power generation. In an embodiment, substantially all generated electric power not used by the gin may be returned to a grid as returned power.

In embodiments, the operating conditions of pyrolysis and gasification system 5 are adjusted depending on the desired products. For instance, the operating conditions may be modified depending on whether the amounts of bio-oil, char or syngas (i.e., syngas 70 and/or reduced contaminant syngas 75) are desired to be adjusted. It is to be understood that conditions vary with different biomass feedstocks. In an embodiment, the operating temperature of reactor 15 is between about 400° C. and about 600° C. Without limitation, such temperature range increases the amount of bio-oil produced. In embodiments, increasing the feed rate of the biomass feedstock increases the amount of bio-fuel produced. In some embodiments, the operating temperature of reactor 15 is between about 300° C. and about 400° C. Without limitation, such temperature range increases the amount of char produced. In embodiments, the operating temperature is between about 700° C. and about 800° C. Without limitation, such temperature range increases the amount of syngas produced.

In an embodiment, reactor 15 includes insulation (not illustrated). Any suitable insulation for a reactor may be used. In an embodiment, the insulation is made of refractory material. In some embodiments, reactor 15 includes a gap (not illustrated) between the reactor bed 20 and the refractory insulation. Without limitation, the gap allows for the removal of excess heat from the reactor 15 to heat the incoming air for improved efficiency. In some embodiments, the gap may allow the use of steam through the input air to improve the quality of syngas 70.

In an embodiment, pyrolysis and gasification system 5 may be operated in a continuous mode without the use of external power. In such an embodiment, pyrolysis and gasification system 5 may be plugged into another operational fluidized bed gasifier (i.e., another pyrolysis and gasification system 5) and therefore would not need any external heat.

In embodiments, pyrolysis and gasification system 5 is transportable. Pyrolysis and gasification system 5 may be transported by any suitable means. In an embodiment, pyrolysis and gasification system 5 is disposed upon a trailer, which is pulled by a vehicle such as a tractor trailer.

Although the present invention and its advantages have been described in detail, it should be understood that various changes, substitutions and alterations may be made herein without departing from the spirit and scope of the invention as defined by the appended claims.

What is claimed is:

1. A method for gasification and/or pyrolysis of a biomass feedstock in a reactor, wherein the reactor comprises a reactor bed and bed materials, comprising:
    (A) introducing a fluidizing medium to the bed materials disposed in the reactor to fluidize the bed materials and produce a fluidized reactor bed;
    (B) heating the bed materials disposed in the reactor to a desired temperature, wherein the heating is provided by a heat source;
    (C) feeding the biomass feedstock through the fluidized reactor bed, wherein a reaction produces a synthesis gas and bio-char from the biomass feedstock, wherein the synthesis gas comprises a mixture of gases evolved from pyrolysis or gasification;
    (D) controlling operating conditions to prevent the reaction from proceeding into a combustion mode;
    (E) feeding the synthesis gas and bio-char from the reactor to a cyclone assembly, wherein the cyclone assembly comprises one or more cyclones that separate the bio-char from the synthesis gas to produce a bio-char reduced synthesis gas; and
    (F) feeding the bio-char reduced synthesis gas to a pressure swing absorption system to remove contaminants from the bio-char reduced synthesis gas, wherein the pressure swing absorption system comprises one or more absorbers operating at temperatures between about 150° C. and about 200° C., and wherein the contaminants comprise carbon monoxide, methane, and hydrogen.

2. The method of claim 1, further comprising selecting bed materials of a desired size.

3. The method of claim 1, further comprising removing the heating provided by the heat source when the desired temperature is achieved.

4. The method of claim 1, further comprising determining a feed rate of the biomass feedstock through the fluidized reactor bed based on the type of biomass feedstock.

5. The method of claim 1, further comprising controlling feed rate of the fluidizing medium to the bed materials based on the type of biomass feedstock.

6. The method of claim 1, wherein controlling the operating conditions comprises increasing the temperature of the reactor by increasing the flow rate of the fluidizing medium and maintaining the feed rate of the biomass feedstock.

7. The method of claim 6, wherein controlling the operating conditions optionally comprises decreasing the temperature of the reactor by increasing the feed rate of the biomass feedstock and maintaining the flow rate of the fluidizing medium.

8. The method of claim 1, further comprising maintaining a minimum air flow rate to maintain a fluidized condition.

9. The method of claim 1, further comprising feeding the synthesis gas to a condenser to produce bio-oil.

* * * * *